Jan. 10, 1928.  
H. DENNIS  
BONE SHAPING AND THREADING DEVICE  
Filed March 28, 1924  
1,655,943  
2 Sheets-Sheet 1
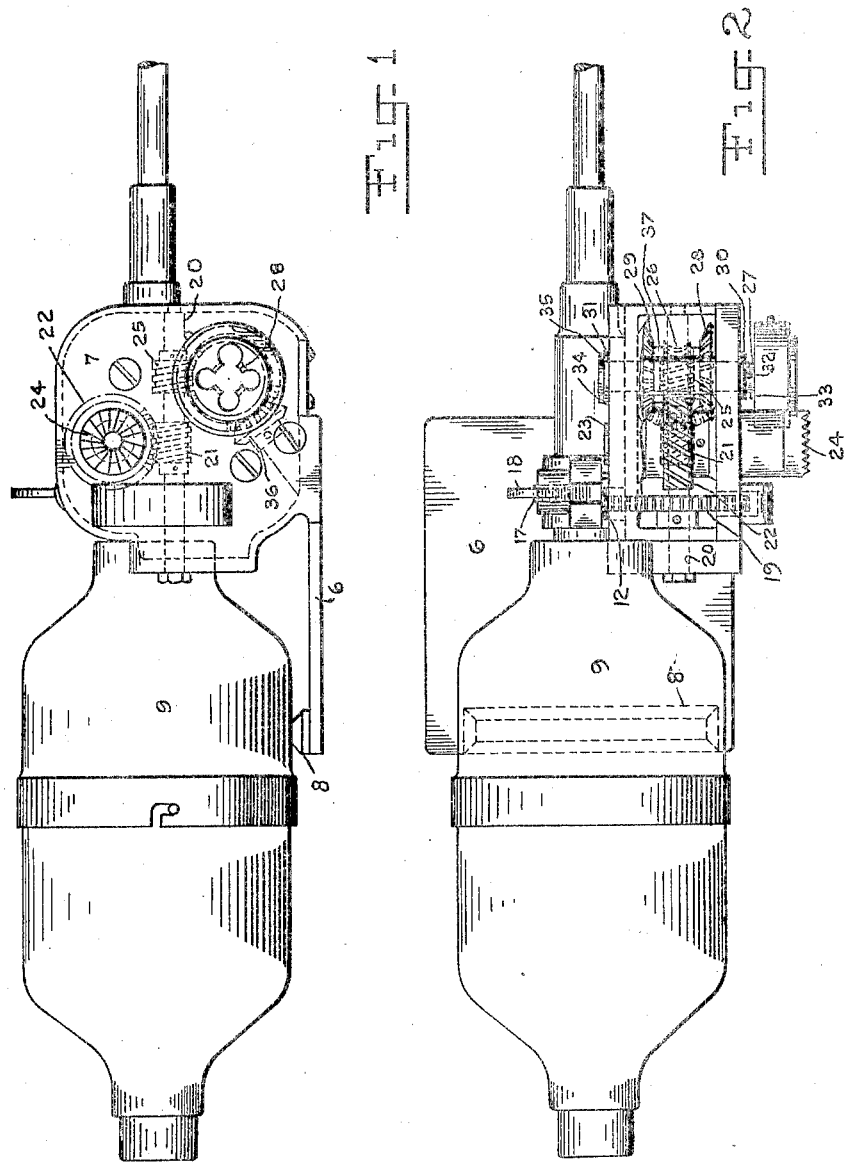
Inventor  
Hugh Dennis  
By his Attorney  
Clarence G. Campbell Jan. 10, 1928.                                                          1,655,943
H. DENNIS
BONE SHAPING AND THREADING DEVICE
Filed March 28, 1924                    2 Sheets-Sheet 2

Patented Jan. 10, 1928.

1,655,943

UNITED STATES PATENT OFFICE.

HUGH DENNIS, OF NEW YORK, N. Y., ASSIGNOR TO THE KNY-SHEERER CORPORATION OF AMERICA, OF NEW YORK, N. Y., A CORPORATION OF NEW YORK.

BONE SHAPING AND THREADING DEVICE.

Application filed March 28, 1924. Serial No. 702,484.

This invention relates to a bone shaping and threading device and the novelty consists in the adaption and arrangement of the parts as will be more fully hereinafter pointed out.

The treatment of bone fractures in which the setting of new pieces of bone are involved often requires the pinning of the piece of bone which is being inlaid to the surrounding bone tissue in which it is placed in order to assure the inlay staying in exact position and growing in such position.

In order to accomplish satisfactory results it has been found necessary to use pins for this purpose made of the shin bone of the patient the same as the inlay, as otherwise there is always the serious danger of infection and the grave doubt of perfect knitting, both of which are overcome by the use of the patient's own bone.

The making of such a pin which must be also threaded to be effective requires means for doing this quickly and under perfectly sterile conditions. My device is adapted to solve both of these problems and to shape the pins of bone taken from the shin bone of the patient and thread same without loss of time and under perfectly sterile conditions.

Figure 3:
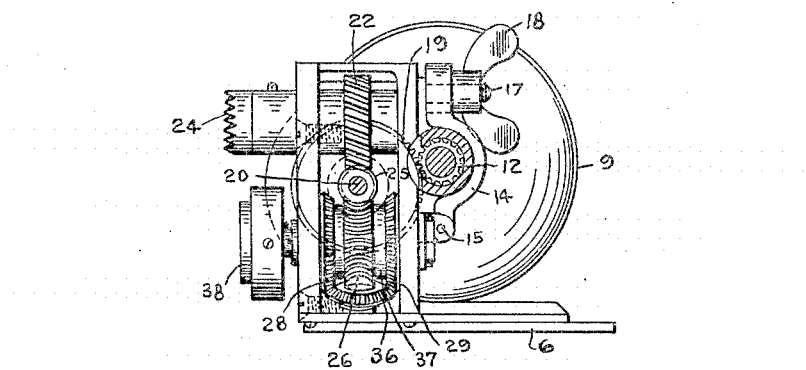
Figure 4:
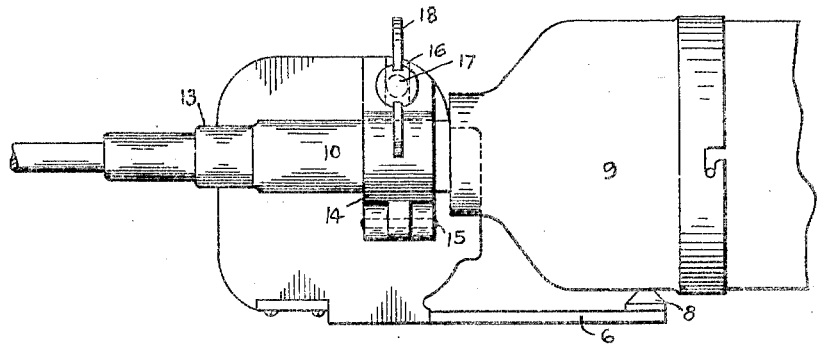
Figure 5:
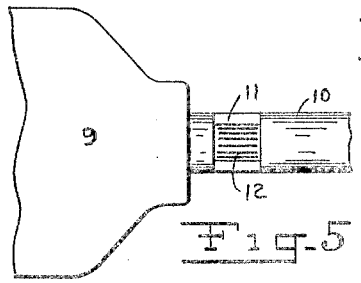

Referring to the drawings Figure 1 is a side view of my device showing parts in dotted outline. Figure 2 is a top plan view of the same with the top of the casing cut away for the purpose of showing the operative parts therein. Figure 3 is an end view of my device looking in from the right hand side of Figure 1 and with the end of the casing cut away in order to show the interior parts. Figure 4 is a side view of the back of the device as shown in Figure 1 part being broken away for convenience in illustration. Figure 5 is a detail of the gear on the driving shaft of the motor.

In the drawings 6 is a base member to which is rigidly secured a casing 7 at one end and having a rest 8 for an electric motor 9 at the other end, said electric motor 9 being of the usual construction used in these devices and having the usual sterilizable shell. From the outer end of said motor 9 projects a shaft casing 10 having a cut-out portion 11 whereby a gear 12 cut in a driving shaft 13 of said motor 9 is exposed as the motor 9 is placed in position resting on the rest 8 and is clamped to the casing 7 by means of a clamp 14 which is hinged at 15 to the side of the casing 7 and adapted to be locked in fixed position by means of said clamp 14 having a slot 16 passing over a threaded pin 17 rigidly secured in the casing and locking said clamp by means of wing nut 18 which screws down on said threaded pin 17. The shaft 13 of the motor 9 is thus secured in such a position by means of the clamp 14 that the gearing 12 will mesh with a cut gear 19 which is mounted in the casing 7 so that it will turn freely therein. On the shaft 20 is rigidly mounted worm gear 21 which is adapted to be in constant mesh with a cut gear 22 which is rigidly mounted on a shaft 23 which is mounted in the casing 7 so as to rotate freely therein and carry a dowel 24 at the outer end. A second worm gear 25 is also rigidly secured to the shaft 20 and is constantly in mesh with a worm wheel 26 which is rigidly secured to a shaft 27 which is mounted in the casing 7 so that it will rotate freely therein. There is mounted on the inside of the casing 7 and over the shaft 27 a tool spindle bevel gear 28 and also a second tool spindle bevel gear 29 both having suitable tubular bearing members 30 and 31 respectively in said casing 7 over the shaft 27. A pin 32 is rigidly mounted in the side of the bearing member 30 and a pin 33 is also rigidly mounted in the shaft 27 so that they will lock and engage when in alignment. A pin 34 is rigidly mounted in the bearing member 31 and a pin 35 is rigidly mounted in the shaft 27 so that they will lock and engage when in alignment. An idler gear 36 is mounted in the base of the casing 7 so that it will rotate freely and always be in mesh with the spindle bevel gears 28 and 29 and spindle bevel gear 28 is rigidly secured to a cylindrical bearing member 37 to which the gearing 26 is also rigidly secured so that the spindle bevel gear 28 travels with the gear 26 and the cylindrical bearing 37. Through the idler gear 36 the spindle bevel gear 29 is constantly driven in the opposite direction from the spindle bevel gear 28.

In operating my device as the motor is clamped into position the motion from the shaft 13 is transferred through the gear 12 to the gear 19 and the shaft 20 thereby being set in rotation also rotates worm gear 21 which meshes with cut gear 22 thereby setting in operation the dowel 24. The worm gear 25 is also set in operation by the rotation of the shaft 20 and through the worm wheel 26 spindle bevel gear 28 which is on the same cylindrical bearing 37 travels therewith thereby setting in motion the idler gear 36 which transfers the motion to the spindle bevel gear 29. As the bone has been shaped into a pin by means of the dowel 24 it can then be threaded by means of a threader 38 of usual construction which is rigidly secured to shaft 27 and as the pin shaped bone is pushed into the threader 38 the pin 33 will engage with pin 32 thereby rotating the thread cutter 38 in the same direction as the spindle bevel gear 28 is traveling and thereby accomplishing the threading of said bone pin. As the threading of the bone pin is completed the operator will draw back on the bone pin thereby disengaging pins 32 and 33 and engaging pins 34 and 35 so that the shaft 27 and the threader 38 will be rotated in the opposite direction by means of gear 29 and permitting the threaded bone to be withdrawn.

My device as is seen from the drawings is adapted to be used with the usual motor and shaft used in connection with such operations being easily, quickly and firmly secured in position for operating my bone cutting and threading device and being as readily detached for use in connection with saws or other operations usual to bone operating.

It will also be noted that my device is so constructed that it can be readily and completely sterilized which is essential for the carrying out of such operations successfully.

I claim:

1. In a bone shaping and threading device the combination of a base member, a case carried by said base, a dowel and a thread cutter mounted in said casing, a large gear and a train of gears driven thereby mounted in said casing so as to drive said dowel and thread cutter, a motor having a gear cut in its shaft adapted to mesh with said large gear and means for detachably securing said motor to said casing.

2. In a device of the character described the combination of a base member, a case rigidly secured thereto, a large gear mounted on a longitudinal shaft and rotating freely therewith in said case and extending through an opening on one side of said case, a worm gear on said shaft meshing with a cut gear on a cross shaft carrying a dowel, a second worm gear on said longitudinal shaft meshing with a worm wheel mounted on a cylindrical bearing on which a spindle bevel gear is mounted, a second spindle bevel gear mounted in said case and an idler gear between said spindle bevel gears, a second cross shaft carrying a thread cutter passing through both of said spindle bevel gears and said worm wheel and means for engaging said thread cutter shaft with either of said spindle bevel gears.

3. In a device of the character described the combination of a base member, a case rigidly secured thereto, a large gear mounted on a longitudinal shaft and rotating freely therewith in said case and extending through an opening on one side of said case, a worm gear on said shaft meshing with a cut gear on a cross shaft carrying a dowel, a second worm gear on said longitudinal shaft meshing with a worm wheel mounted on a cylindrical bearing on which a spindle bevel gear is mounted, a second spindle bevel gear mounted in said case and an idler gear between said spindle bevel gears, a second cross shaft carrying a thread cutter passing through both of said spindle bevel gears and said worm wheel and means for engaging said thread cutter shaft with either of said spindle bevel gears, a motor having a gear cut in its shaft adapted to mesh with said large gear in the case and means for detachably securing said motor to the side of said case.

4. In a device of the character described the combination of a base member, a case rigidly secured thereto, a large gear mounted on a longitudinal shaft and rotating freely therewith in said case and extending through an opening on one side of said case, a worm gear on said shaft meshing with a cut gear on a cross shaft carrying a dowel, a second worm gear on said longitudinal shaft meshing with a worm wheel mounted on a cylindrical bearing on which a spindle bevel gear is mounted, a second spindle bevel gear mounted in said case and an idler gear between said spindle bevel gears, a second cross shaft carrying a thread cutter passing through both of said spindle bevel gears and said worm wheel and means for engaging said thread cutter shaft with either of said spindle bevel gears, a motor having a gear cut in the shaft adapted to mesh with said large gear in the case and means for detachably securing said motor to the side of said case comprising a hinged clamp, a threaded pin and a threaded wing nut cooperating therewith.

5. In a device of the character described the combination of a base member, a case rigidly secured thereto, a large gear mounted on a longitudinal shaft and rotating freely therewith in said case and extending through an opening on one side of said case, a worm gear on said shaft meshing with a cut gear on a cross shaft carrying a dowel, a second worm gear on said longitudinal shaft meshing with a worm wheel mounted on a cylindrical bearing on which a spindle bevel gear is mounted, a second spindle bevel gear mounted in said case and an idler gear between said spindle bevel gears, a second cross shaft carrying a thread cutter passing through both of said spindle bevel gears and said worm wheel and means for engaging said thread cutter shaft with either of said spindle bevel gears comprising a pin on said thread cutter shaft adapted to engage a pin on the cylindrical bearing of said first spindle bevel gear as said cutter shaft is pushed in and a pin on said cutter shaft adapted to engage a pin on said second spindle bevel gear bearing as said cutter shaft is pulled out.

6. In a device of the character described the sterilizable combination of a base and a case secured thereto containing a dowel, a cutter, a threader adapted to change direction and a train of gears connected to said cutter and threader and a motor detachably secured to said casing having a shaft with a gear cut therein adapted to drive said train of gears.

7. In a bone shaping and threading device the combination of a base member, a case carried by said base member, means mounted in said casing for shaping a bone, means mounted in said casing for threading said shaped bone, means mounted in said casing for driving said shaping and said threading means and a motor adapted to be separably secured to said casing and having a shaft with a gear cut therein adapted to engage said driving means.

In testimony whereof I affix my signature.

HUGH DENNIS.